(No Model.)
G. WARD.
Vehicle Seat Fastener.
No. 238,317. Patented March 1, 1881.
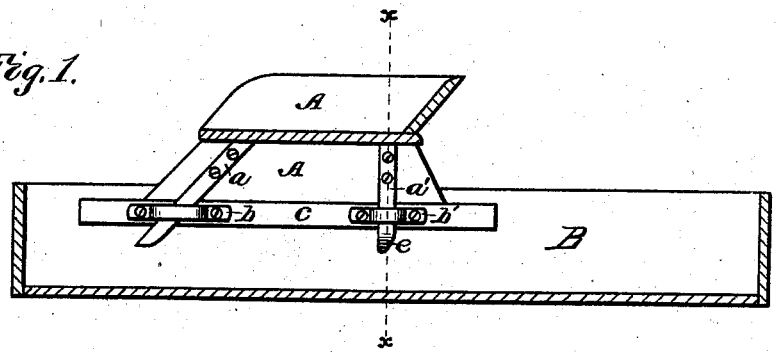
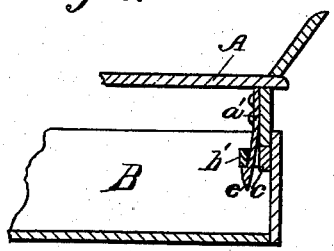

UNITED STATES PATENT OFFICE.

GEORGE WARD, OF CHARLOTTE, MICHIGAN.

VEHICLE-SEAT FASTENER.

SPECIFICATION forming part of Letters Patent No. 238,317, dated March 1, 1881.

Application filed January 24, 1881. (No model.)

*To all whom it may concern:*

Be it known that I, GEORGE WARD, of Charlotte, in the county of Eaton and State of Michigan, have invented a certain new and useful Improvement in Seat-Fasteners, of which the following is a specification.

The object I have in view is to produce a simple and efficient fastener for the movable seats of wagons, sleighs, and other vehicles which will be self-locking and will hold such seats securely in place, and at the same time to permit them to be readily removed or adjusted.

My invention consists in the peculiar devices employed by me for this purpose, as fully hereinafter explained and pointed out by the claim.

In the accompanying drawings forming a part hereof, Figure 1 is a sectional elevation of the body and seat of a spring-wagon, showing my self-locking fastener in position. Fig. 2 is the elevation of the fastener with the keeper in section.

Like letters denote corresponding parts in both figures.

A A is the seat of a wagon, sleigh, or other vehicle, which rests on the cleat $c$, secured to the inner surface of the body B.

Seats of this character are usually placed on the cleat $c$ without fastening, and are thus liable to be displaced or easily tipped over, and are the cause of frequent accidents.

By my invention there is secured, preferably to the inner side of each seat, a plate, $a$, in a slanting position, as shown in Fig. 1, which passes through the socket or loop $b$, which is fastened to the cleat $c$, the plate $a$ projecting below the loop $b$. There is also secured, preferably to the inside of the seat, as shown in Fig. 1, the plate $a'$, which passes through the loop $b'$, which is also fastened to the cleat $c$. The plate $a'$ is a spring provided with a beveled or tapered head, $e$. At the upper end of the head $e$ is a shoulder, the upper portion of which, when in position, is on the lower line of the socket $b'$. The upper half of the inside of the socket $b'$ is rounded out or beveled, in order better to receive the head of the plate or spring $a'$.

To place the seat in position, the plate $a$ is passed through the loop or socket $b$. This will bring the head $e$ of the plate or spring $a'$ directly over the socket $b'$, when the head $e$ can be entered into the socket $b'$, and the seat will drop into position. To remove the seat, press outward upon the head $e$ until the shoulder has passed the line of the socket $b'$, and then raise the seat.

I claim as my invention—

The combination, with the loose seat and the body of a vehicle, of the plate $a$ and the plate-spring $a'$, attached to the seat and engaging with sockets or keepers $b$ and $b'$ on the body of the vehicle or on the cleat or rail $c$, retaining the seat in position, substantially as described, by means of the shoulder at the upper part of the head $e$ catching under the outer portion of the socket or keeper $b'$.

GEORGE WARD.

Witnesses:
GEO. M. ELY,
C. M. ATKINS.